UNITED STATES PATENT OFFICE.

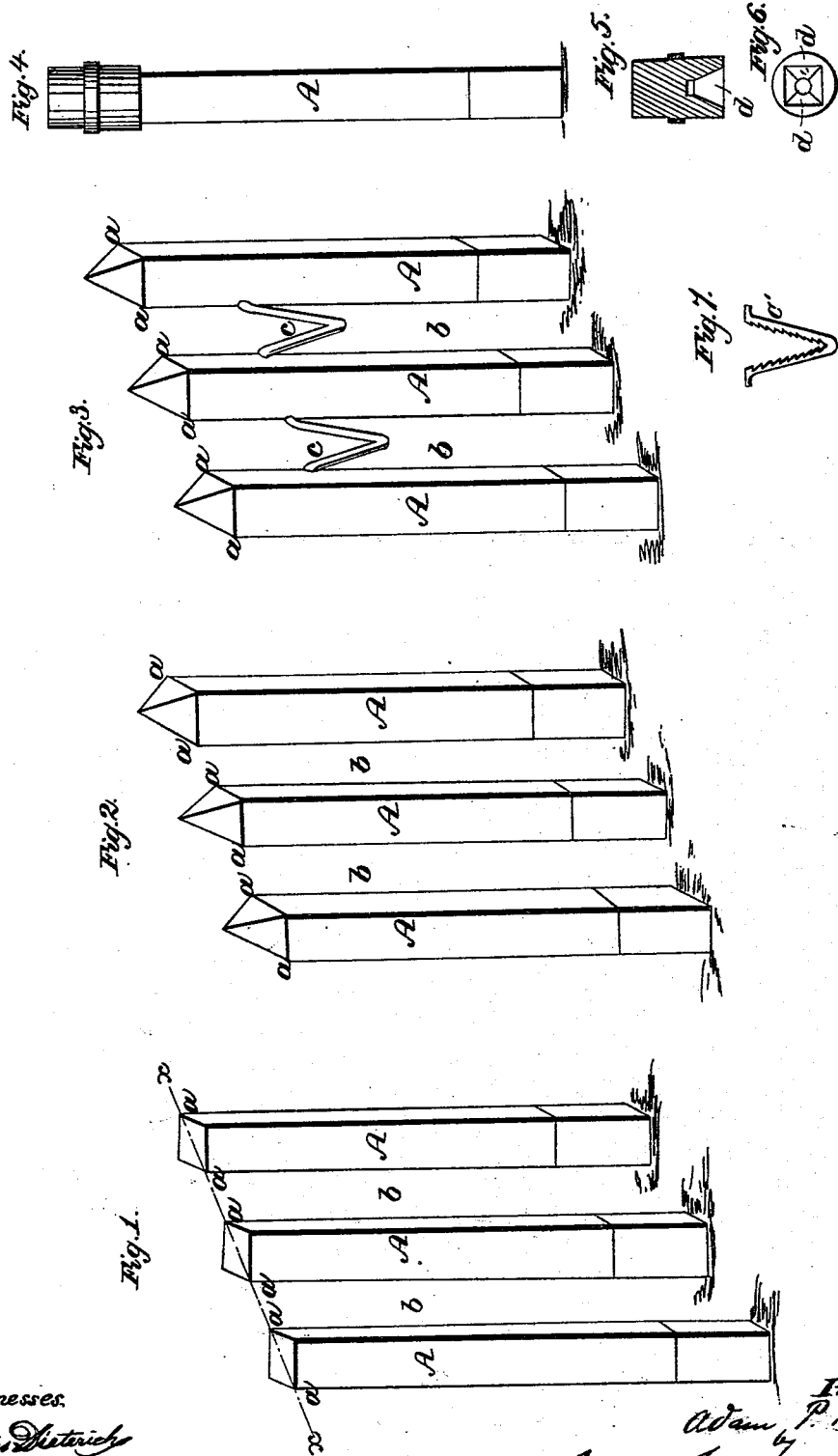

ADAM P. HOPKINS, OF BENTLEYSVILLE, PENNSYLVANIA.

IMPROVED FENCE FOR SHEEP-FOLDS.

Specification forming part of Design No. 36,651, dated October 14, 1862.

*To all whom it may concern:*

Be it known that I, ADAM P. HOPKINS, of Bentleysville, in the county of Washington and State of Pennsylvania, have invented a new and Improved Mode of Constructing Fences for Sheep-Folds and Fences generally; and I do hereby declare that the following is a full and exact description thereof, reference being had to the accompanying drawings, forming a part of my specification, like letters in the several figures indicating the same or analogous parts, and in which drawings—

Figure 1 is a perspective view indicating the "set" of the posts composing the fence in the "line" or direction in which the fence is built; Fig. 2, a like view with the top of the posts beveled to a peak; Fig. 3, a like view with the trap-irons let into the posts on the line of their contiguous edges; Fig. 4, a view showing the application of a "setting-iron" to the top of the post to receive the blows of a sledge-hammer or beetle while the post is being driven into the ground; Fig. 5, a sectional view of the setting-iron; Fig. 6, a plan view of Fig. 5; and Fig. 7, a view of the trap-iron shown in Fig. 3, but having inner serrated or sharp-pointed edges.

The object of my invention is to so construct a fence for the protection of sheep, so as to entirely secure that valuable animal from the ravages of worthless vagrant dogs; and at the same time I so construct the fence as to prevent the ingress of a dog into the sheep-fold; provide the means whereby, if he attempts to jump over it, he will be caught in the act; and the further object to promote cheapness in construction, saving of material, and the occupancy of less ground in the erection.

In Figs. 1, 2, and 3 of the drawings, sections of a fence are shown composed of square posts A, having two of their four corners, as at *a*, contiguously set on the line of the direction in which the fence is built, as clearly indicated in red line *x x*, Fig. 1; the space *b* between each post being, say, about three inches in width, or such width as will effectually prevent a dog from squeezing his body through the fence between the posts.

It is well known that a dog will not voluntarily attempt to jump a fence unless some portion of the fence affords a means of support for his hind legs during the act. By my construction I do away, as shown in Fig. 2, not only with all available support for his hind legs, but his fore legs or feet also, the top of the posts being pointed or peaked, as represented in the figure.

It is true many dogs would attempt to jump a fence constructed like that shown in Fig. 2 if pressed by hunger or thirsting for blood; but one essay, or two at the most, will ordinarily convince a vicious dog of the fruitlessness of the endeavor after he shall have slid down the posts with his fore legs clasping the sharp corners *a*, thus subjecting them to the lacerating effects of such edges or corners, it being evident that such attempt would so result, there being no means of support for his legs, and he naturally clasping the post to save himself from a fall.

By the application of trap-irons, as at *c*, Fig. 3, and *c'*, Fig. 7, a dog failing in an attempt to jump over the fence, and clinging to one of the posts on such failure, would, on sliding down a post, have each of his fore legs caught in the trap-irons; and, as the trap-irons are intended to be set high enough up the post to suspend a dog when so caught, his escape from the trap would be impossible. These trap-irons may have either knife or serrated edges, as desired.

Fig. 5 represents a setting-iron, to be used for forcing the posts into the ground when necessary, the cavity in its bottom, as at *d*, being fitted to receive the peaked ends of the posts, as indicated in Fig. 4, and thus save the battering of the tops of the posts whenever necessary to set or reset them in the line of the fence. The posts may at their bottoms, for the depth they enter the ground, and for a short distance above the surface, be saturated with coal-tar to prevent decay.

A sheep-fold thus constructed, at the same time it affords an excellent fence, easy and simple to build, is an efficient barrier to the natural enemy of the sheep within.

Having thus described my invention, what I claim as new, and desire to secure by Letters Patent of the United States, is—

Constructing fences with posts A and trap-irons *c*, substantially in the manner and for the purpose set forth.

ADAM P. HOPKINS.

Witnesses:
 JOHN S. NORMINE,
 J. G. HART.